(12) United States Patent
Thiffault

(10) Patent No.: US 6,382,089 B1
(45) Date of Patent: May 7, 2002

(54) CUTTING DEVICE FOR CITRUS FRUIT

(76) Inventor: Jean-Claude Thiffault, 6891, Christhophe-Colomb app. 103, Montreal, (Quebec) (CA), H2S 2H3

( * ) Notice: Subject to any disclaimer, the term of this patent is extended or adjusted under 35 U.S.C. 154(b) by 49 days.

(21) Appl. No.: 09/625,839

(22) Filed: Jul. 26, 2000

(51) Int. Cl.⁷ .............................. A23L 1/00; A23N 3/00; A47J 25/00; B26B 3/00
(52) U.S. Cl. ........................... 99/506; 99/537; 99/538; 99/540; 99/584
(58) Field of Search .......................... 99/506–508, 501, 99/495, 537–540, 541, 542, 543, 544, 545, 547, 562–564, 584, 588, 593; 30/123.5, 114, 113.1, 113.3, 124, 279.2, 278; 83/471.2, 857

(56) References Cited

U.S. PATENT DOCUMENTS

| 868,583 A | * | 10/1907 | Schuyler | ...................... 99/564 |
| 1,040,582 A | | 10/1912 | Royer et al. | |
| 1,206,659 A | * | 11/1916 | Bethke | ...................... 99/540 X |
| 1,423,490 A | | 7/1922 | Vafiades et al. | |
| 1,629,131 A | * | 5/1927 | Sullivan | ...................... 99/584 X |
| 1,674,606 A | * | 6/1928 | Moscrip | ...................... 99/537 X |
| 2,032,562 A | * | 3/1936 | Burns | ........................ 99/540 X |
| 2,505,917 A | * | 5/1950 | Schumacher | ............... 99/538 X |
| 2,969,098 A | * | 1/1961 | Creed | ......................... 99/584 X |
| 4,204,467 A | * | 5/1980 | Peters | .......................... 99/544 |
| 4,383,367 A | * | 5/1983 | Mielnicki | ..................... 99/538 |
| 4,763,414 A | * | 8/1988 | McNiell, Jr. | ............... 99/540 X |
| 4,959,903 A | | 10/1990 | Daoust | |

* cited by examiner

Primary Examiner—Timothy F. Simone

(57) ABSTRACT

A cutting device is disclosed for use to derind a half-section of a citrus fruit. The device has an upwardly opened container with a vertical axis. An upwardly opened cup is coaxially mounted in a removable manner within the container at a short distance from the upper edge thereof, in order to receive and hold he half-section to be derinded. A manually operable knife-supporting element is removably mounted in a rotatable manner coaxially on top of the container. This element has an annular bottom edge shaped and sized to fit and be slidable onto the upper edge of the container. It also has a knife-receiving sleeve that extends at a radial distance from said vertical axis and projects downwardly towards the central bottom portion of the cup. A knife is removably insertable into the sleeve after the half-section has been positioned on top of the container. Once inserted into the sleeve, the knife has its blade that penetrates into the fruit at a short distance from he rind thereof and allows the half-section of the fruit to be derinded upon manual rotation of the knife-supporting element with respect to the container.

12 Claims, 6 Drawing Sheets

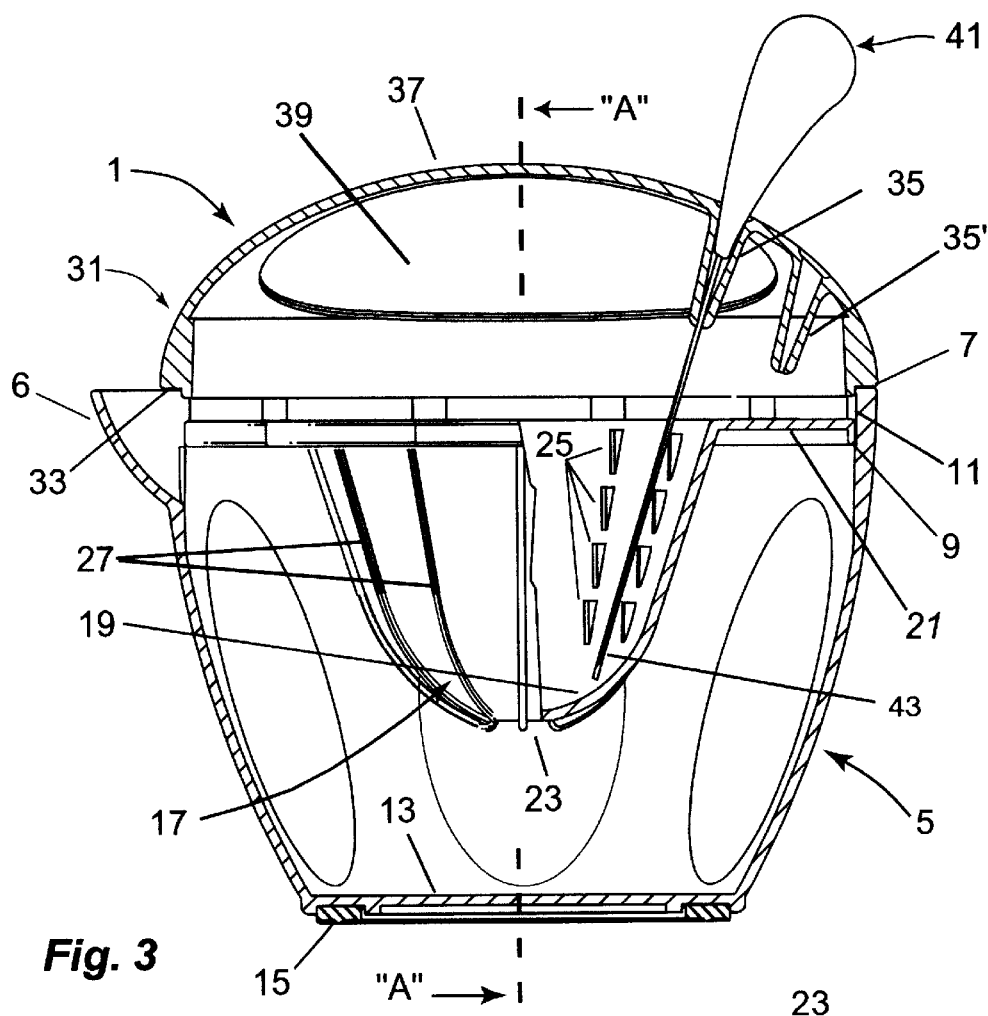
*Fig. 3*
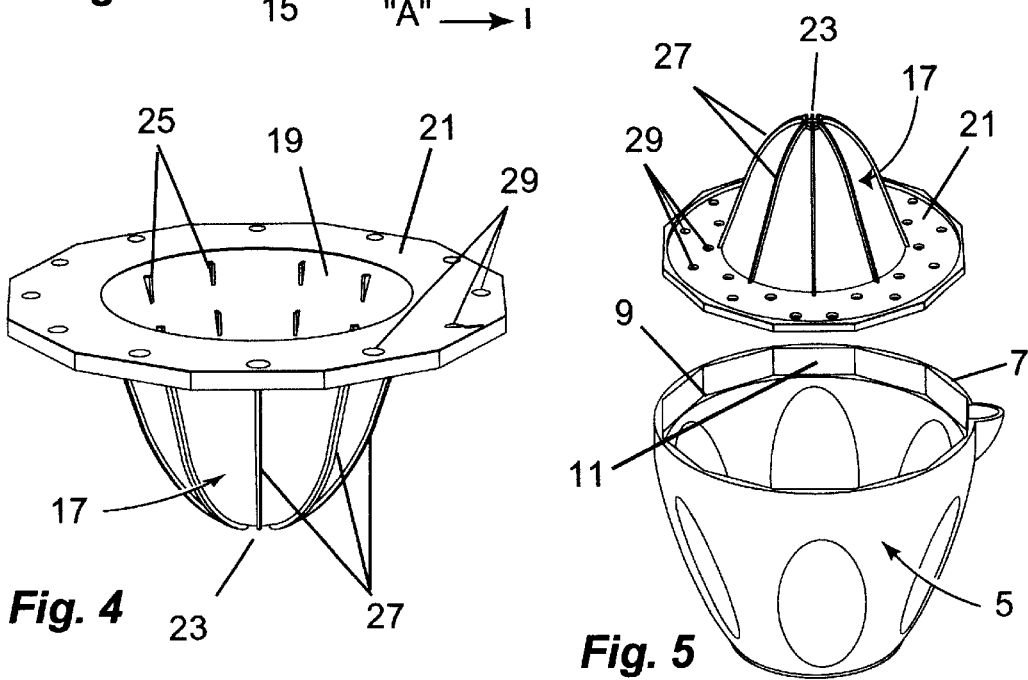
*Fig. 4*  *Fig. 5*

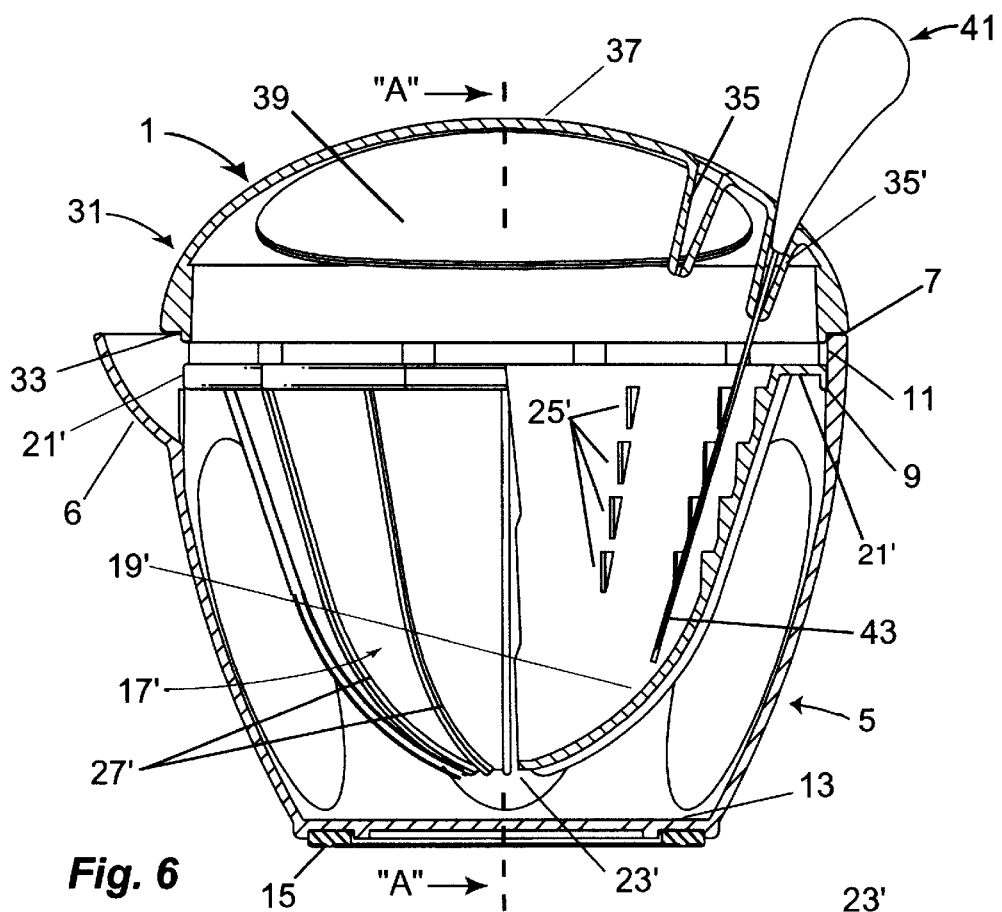
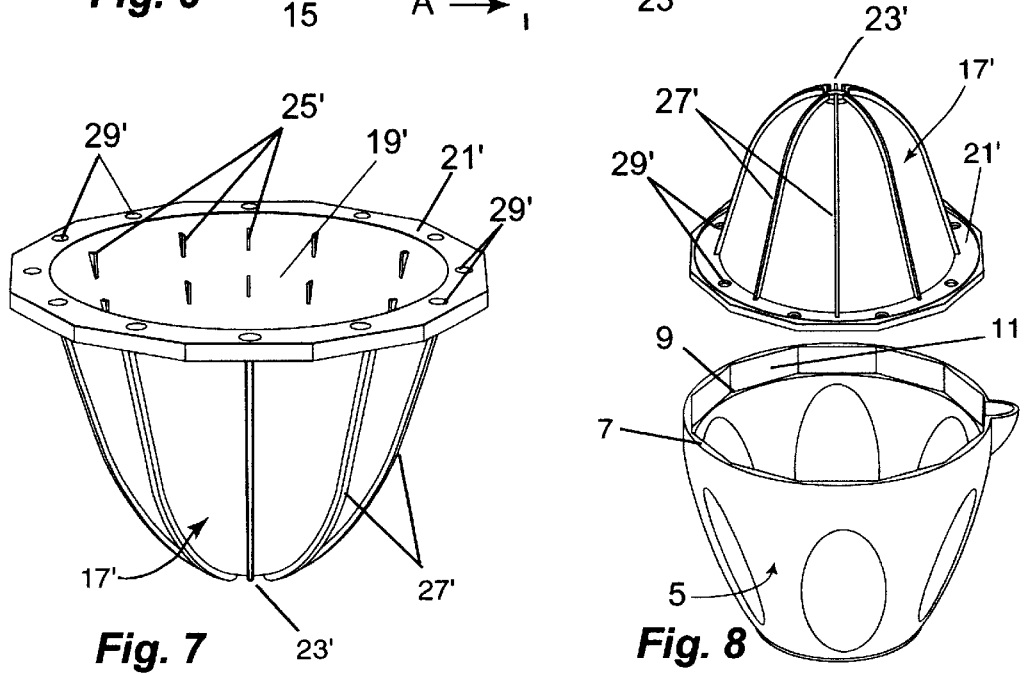
Fig. 6
Fig. 7
Fig. 8 under # US 6,382,089 B1

CUTTING DEVICE FOR CITRUS FRUIT

BACKGROUND OF THE INVENTION a) Field of the Invention

The present invention relates to a cutting device for use to separate the pulp from the skin of fruits and more especially of citrus fruits such as grapefruits, limes, lemons, cumquats, tangerines, oranges and the like eventhough the same device could also be used with other fruits such as melons, kiwis, apples and the like.

b) Brief Description of the Prior Art

As is known, citrus fruits are spherical in shape and have an inner part made of an edible pulp and an outer part called <<rind>>, which consists of a semi-rigid skin. When the fruit is cut in half, its pulp defines a plurality of sector shaped segments each consisting of an edible soft part called <<lith>>, which is surrounded by two opposite semi-rigid fiber partitions. The fiber partitions extend radially from a central fibrous portion up to the rind. Seeds or <<pips>> are often lodged into the lith.

Special knives are provided for cutting the edible part of the pulp from citrus fruits. These knives have a blade that is curved to follow the contour of the skin and they need some manual dexterity to derind the pulp, i.e. scrape the pulp about its interface with the skin.

Other tools also exist, which consist of a semi-spherical open knife made of radially extending blades which can be pressed onto a half-fruit held into a cup, in order to slice its pulp and separate it from the skin while the juice is being collected into an adjacent container. In this connection, reference can be made to U.S. Pat. No. 1,040,582 granted in 1912 and U.S. Pat. No. 1,423,490 granted in 1922.

U.S. Pat. No. 4,959,903 granted on Oct. 2, 1990 discloses a cutting device which is presently sold worldwide under the trademark STARFRIT/CITRUS EXPRESS and which comprises:

an upwardly opened container for receiving pulp segments of the fruit;

a fruit derinding member sized and shaped to fit on top of the container;

a fruit segmenting member sized and shaped to fit above the fruit derinding member on top of the container; and an inverted cup-shaped cover sized and shaped to cover the half-section of the fruit.

The fruit segmenting member comprises a ring which is freely mounted on top of the fruit derinding member in use. It also comprises a set of arcuate knives upwardly projecting from the ring. The knives are spaced apart and converge towards a common apex where they are connected to each other.

The fruit derinding member comprises another ring and at least one arcuate blade upwardly projecting from the other ring. This arcuate blade has a peripherally projecting edge and is shaped, sized and connected onto the other ring in such a manner to extend contiguously to any one of the arcuate knives of the fruit segmenting member when the fruit segment member is fitted on top of the base with the fruit derinding member in between.

In use, the flat face of the half-fruit is applied directly onto the fruit-segmenting member and manually pressed down with the cup-shaped cover in order to segment radially the fruit into a plurality of pulp segments. Then, the cover, the fruit and the fruit segmenting member are manually turned in unison on top of the fruit derinding member and the container, whereby the blade(s) of the fruit derinding member peels the pulp segment out from the skin. After having been cut, the so-peeled segments fall into the container where they can be recovered.

SUMMARY OF THE INVENTION

The object of the present invention is to provide a cutting device for derinding a half-section of a fruit, which device is simple in structure, easy to handle and to use and very efficient to achieve the requested derinding.

More specifically, the invention provides a cutting device for derinding a half-section of a fruit, especially but not exclusively a citrus fruit, which comprises:

an upwardly opened container having a vertical axis and an annular upper edge concentric with the vertical axis;

an upwardly opened cup for receiving and holding the half-section to be derinded, the cup being coaxially mounted in a removable manner within the container at a short distance from the upper edge thereof, and having a central portion with a bottom;

a knife-supporting element removably mounted in a rotatable manner coaxially on top of the container, the element having an annular bottom edge shaped and sized to fit and be slidable onto the upper edge of the container, the element also having a knife receiving sleeve that extends at a radial distance from the vertical axis and projects downwardly towards the bottom of the central portion of the cup; and a knife having a blade removably insertable into the sleeve after the half-section has been positioned in the cup and the knife-supporting element has been positioned on top of the container.

Once inserted into the sleeve, the blade of the knife penetrates into the fruit at a short distance from the rind thereof and allows the half-section of said fruit to be derinded upon rotation of the knife supporting element with respect to the container.

In accordance with a particularly preferred embodiment of the invention, the device comprises two or more cups having central portions of different sizes to receive fruits of corresponding different sizes. Then, the knife-supporting element comprises a corresponding number knife receiving sleeves located at different radial distances to allow optimum adjustment of the position of the blade of the knife depending on the size of the central portion of the selected cup.

The invention, its structure, its operation and its advantages will be better understood upon reading the following non-restrictive description of preferred embodiments thereof, made with reference to the accompanying drawings.

BRIEF DESCRIPTION OF THE DRAWINGS

FIG. 3 is a side elevational, cross-section view of the device shown in FIG. 1, with an upwardly opened cup sized to receive a small fruit, such as a lemon or orange;

FIG. 4 is a perspective view of the cup shown in FIG. 3;

FIG. 5 in an exploded perspective view of the cup and container of the device shown in FIG. 3, ready to be used as a citrus juicer;

FIGS. 6, 7 and 8 are views similar to FIGS. 3, 4 and 5, respectively, where the device shown in FIGS. 1 to 3 is provided with a cup sized to receive a large fruit such as a grapefruit.

DESCRIPTION OF PREFERRED EMBODIMENTS OF THE INVENTION

Figure 9:
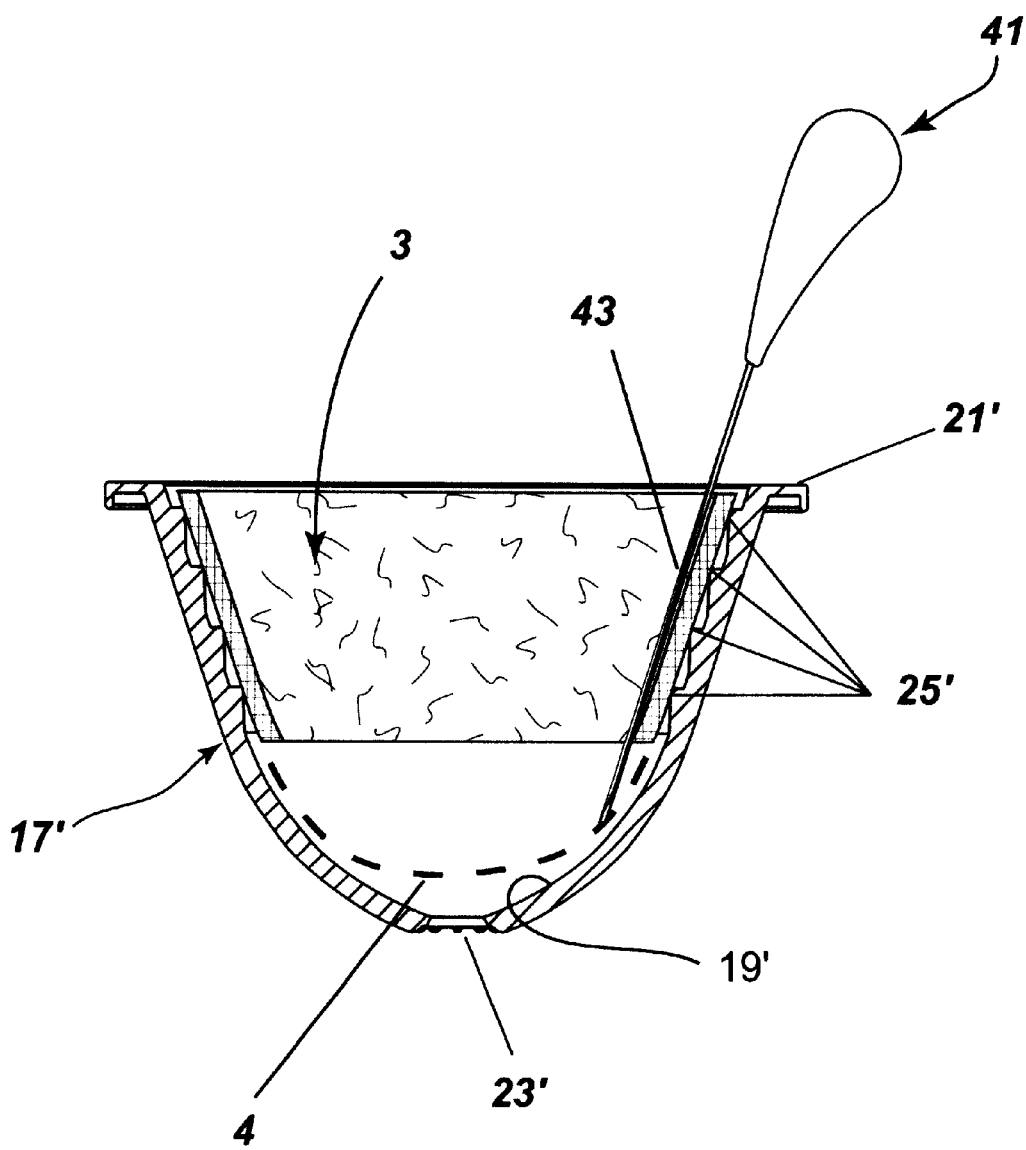
FIG. 9 is a side elevational cross-section view of the cup shown in FIGS. 6 to 8, with a grapefruit positioned in it and the blade of the knife inserted in cutting position.

The cutting device 1 according to the first preferred embodiment of the invention illustrated in the accompanying drawings is a manual device intended to be used for derinding a half-section 3 of a fruit, especially a citrus fruit such as a lemon or a grapefruit (see FIG. 9).

The cutting device 1 comprises an upwardly opened container 5 having a vertical axis "A". The container 5 comprises an annular upper edge 7 concentric with the vertical axis. It also comprises an inwardly projecting flange 9 that extends slightly below the upper edge 7. The flange 9 is coaxial to the axis "A" and its upper surface is surrounded by a peripheral wall 11 of polygonal shape. The container further comprises a flat bottom 13 that makes it easy to position onto a table or kitchen counter. Advantageously, anti-skidding means such as a ring of rubber 15 may be attached externally to the bottom 13 of the container to make it more stable once positioned.

The cutting device 1 also comprises at least one and preferably two upwardly opened cups 17, 17' for receiving and holding the half-section to be derinded. The cups 17, 17' have central portions 19, 19' of different sizes to receive fruits of corresponding different sizes. In the illustrated embodiment, the cup 17 is devised to receive "small" fruit such as limes, lemons or small oranges whereas the cup 17' is devised to receive "larger" fruit such as large oranges or grapefruits.

The cups 17, 17' also have upper peripheral edges 21, 21' that are sized and shaped to snugly fit onto the inner top portion of the container 5 and bear onto the flange 9. Because of the polygonal shape of the peripheral wall 11 and the corresponding peripheral edges 21, 21', the cups 17, 17' are prevented from inadvertently rotating about the axis A. In this connection, it may be understood that other locking means could actually be used for preventing such a rotation. By way of example, instead of using a polygonal wall 11 and polygonal edges 21, 21', use could be made of teeth or of a tongue and groove system that would "lock" the cup to the container 5.

In use, one of the cups 19, 19' is to be selected as a function of the size of the fruit to be derinded and then be coaxially mounted in a removable manner within the container 5 as is better shown in FIGS. 3 and 6, in order to support within its central portion the fruit to be derinded after it has been splitted and the bottom 4 of each half portion has been cut (see FIG. 9).

Preferably, the bottoms of the central portions 19, 19' of the cups 17, 17' are each provided with an aperture 23, 23' to allow overflowing juice produced during the cutting, to dip into the container 1 and be collected therein. To facilitate recovery of the so collected juice, the container 5 may be provided with a pouring spout 6, as is shown in the drawings.

Preferably also, the cups 17, 17' have corrugations 25, 25' on the inner surfaces of their central portions 19, 19', which preferably consist of projecting teeth extending in equally spaced apart radial planes. These teeth are shaped and positioned to engage the rind of the fruit to be derinded and to prevent the half-fruit located in the cups 17, 17' from being inadvertently rotated when it is cut as will be explained hereinafter.

The cups 17,17' may also have corrugations 27, 27' on the outer surfaces of their central portions 19, 19' and through holes 29, 29' in their peripheral edges 21, 21'. Such makes it possible to use any one of the cups 17, 17' as a citrus juicer after it has been positioned in upside down on top of the container 5, as is shown in FIGS. 5 and 8.

The cutting device 1 further comprises a manually operable knife-supporting element 31 that can be removably mounted in a rotatable manner coaxially on top of the container 5. The element 31 has an annular bottom edge 33 shaped to define an inner flange sized to fit and be slidable onto the upper edge 7 of the container. The element 3 also has a number of knife receiving sleeves 35, 35' corresponding to the number of cups, which extend at different radial distances from the vertical axis and project downwardly towards the bottom of the central portions 23, 23' of the corresponding cups 17, 17"

Figure 1:
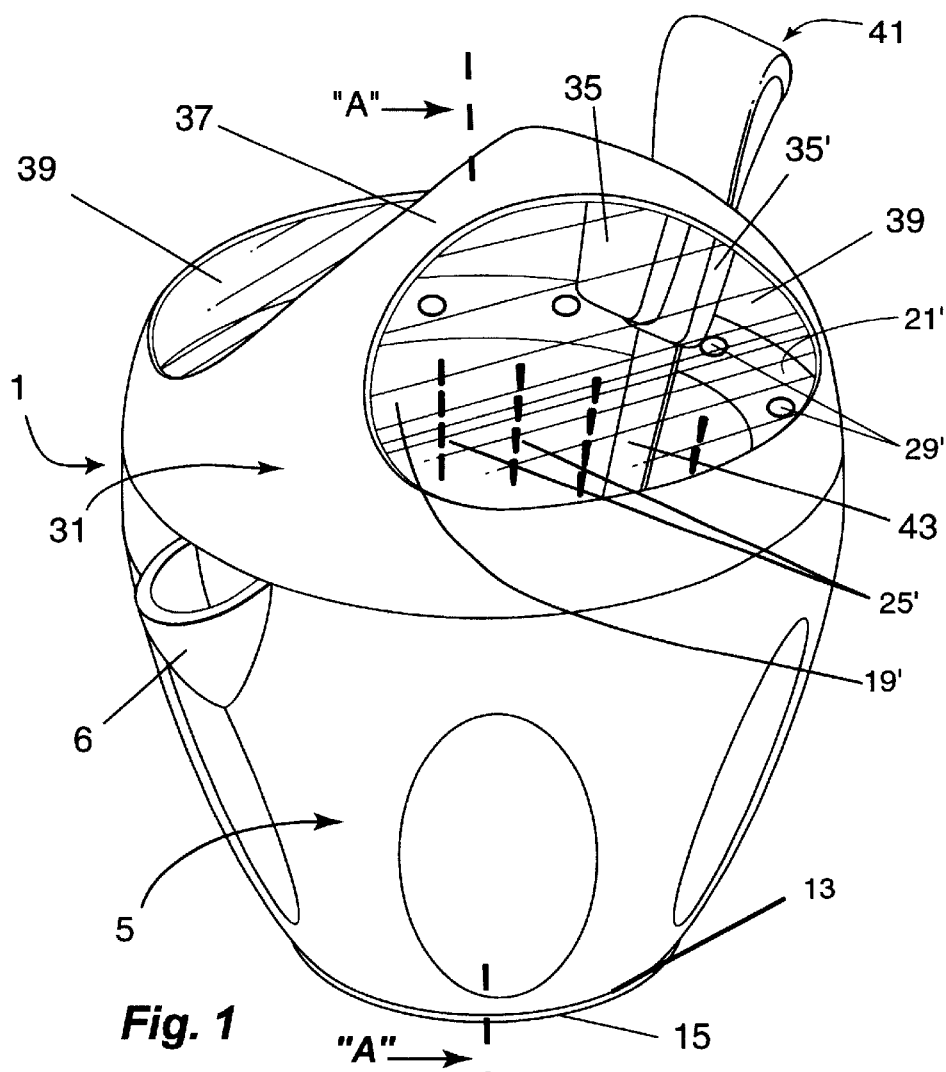
FIG. 1 is a front perspective view of a cutting device for citrus fruit according to a first preferred embodiment of the invention.
Figure 2:
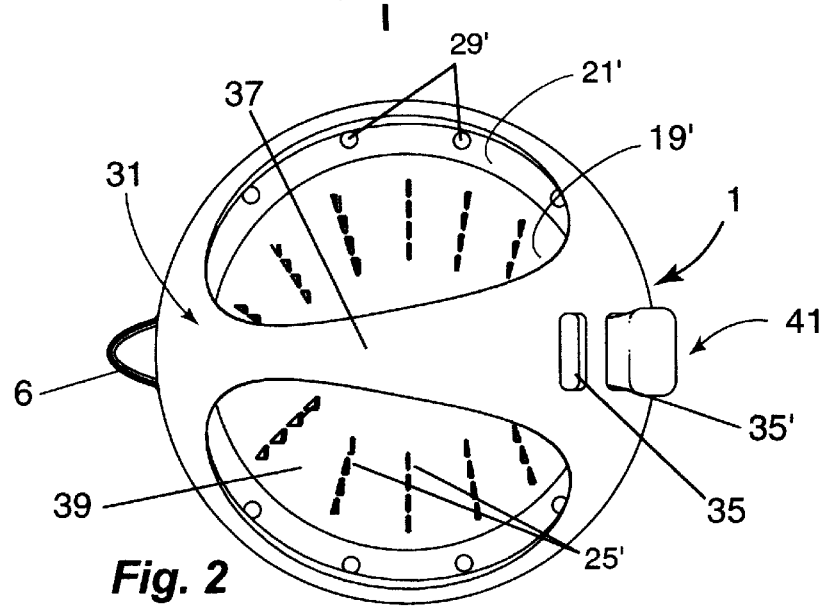
FIG. 2 is a top plan view thereof, at a reduced scale.

Preferably, the knife-supporting element 31 has a central portion 37 devised and shaped to act as a handle in order to facilitate grasping and rotation of the element 31 on top of the container 5. The opposite sides 39 of the central portion 37 may be left open or they may be closed. In the latter case, use can be made of a transparent plastic material as shown in FIGS. 1 and 2, to give the user a visual access to the cup 17 or 17' located within the device 1.

The sleeves 35, 35' are preferably shaped as "duck mouths", as shown in the accompanying drawings. As aforesaid, they are intended to receive a knife 41 whose blade 43 is shaped and sized to be removably insertable into the selected sleeve after the half-section 3 has been positioned in the corresponding cup and the knife-supporting element 31 has been positioned on top of the container 5.The blade 43, once inserted, penetrates into the fruit at a short distance from the rind thereof (see FIG. 9) and allows the half-section of the fruit to be derinded upon manual rotation of the knife supporting element 31 with respect to the container 5.

Of course, the fact that the receiving sleeves 35, 35' are located at different radial distances with respect to the vertical axis "A" permits to achieve optimum adjustment of the position of the blade 43 of the knife 41 depending on the size of the central portion 19, 19' of the selected cups 17, 17'.

As it can be understood, the cutting device 1 as disclosed hereinabove and shown in the accompanying drawings can be made of plastic material. It is very simple in structure. It is also very easy to handle and use and very efficient to achieve derinding of a citrus fruit. It can further be used as a citrus juicer.

Figure 11:
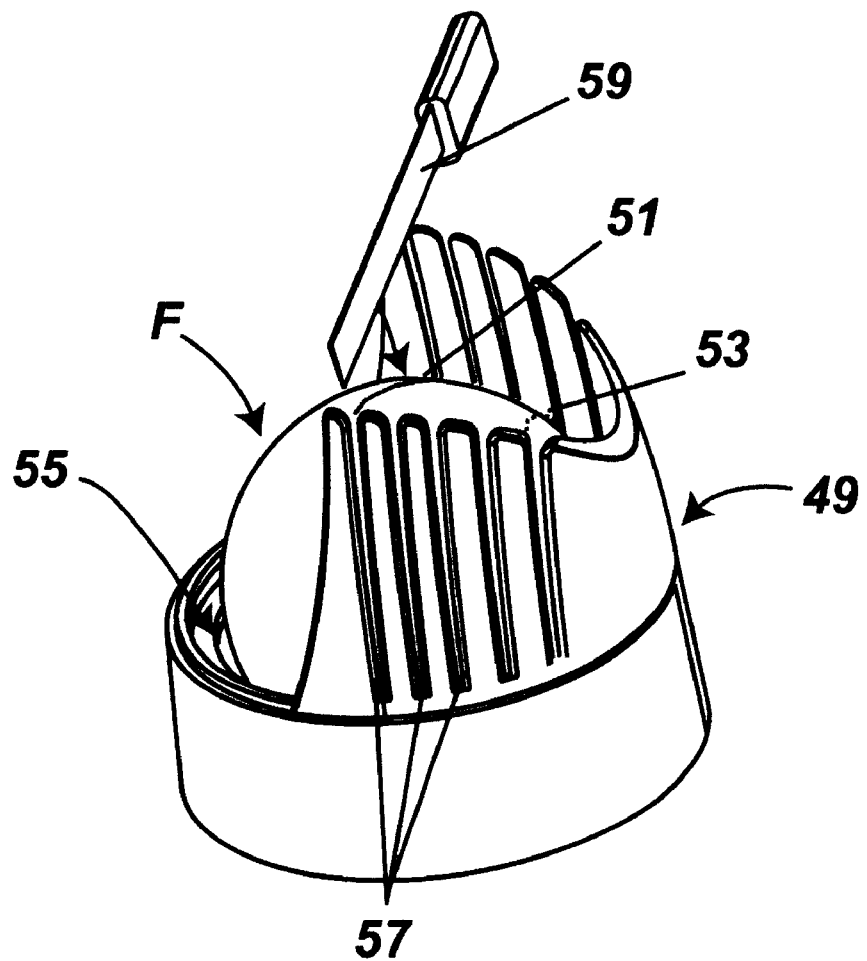
FIG. 11 is a top perspective view of a cutting tool for use to process the fruit prior to derinding it.

For the user's convenience, a cutting tool 49 like the one shown in FIG. 11 can be provided together with the device, in order to facilitate cutting of the fruit "F" to be derinded into half-portions (see the cutting line 51) and cutting of the bottom of each half-portion (see the cutting line 53). Such a tool 49 comprises a cup 55 shaped to receive the fruit to be processed and a plurality of guiding slots 57 that extend upwardly so as to guide a conventional knife 59 in the right cutting planes depending on the size of the fruit. Another tool (not shown) in the form of a sleeve with a cutting edge at one end, may also be provided to allow removal of the "heart" of the fruit after it has been cut with the tool 49.

Figure 10:
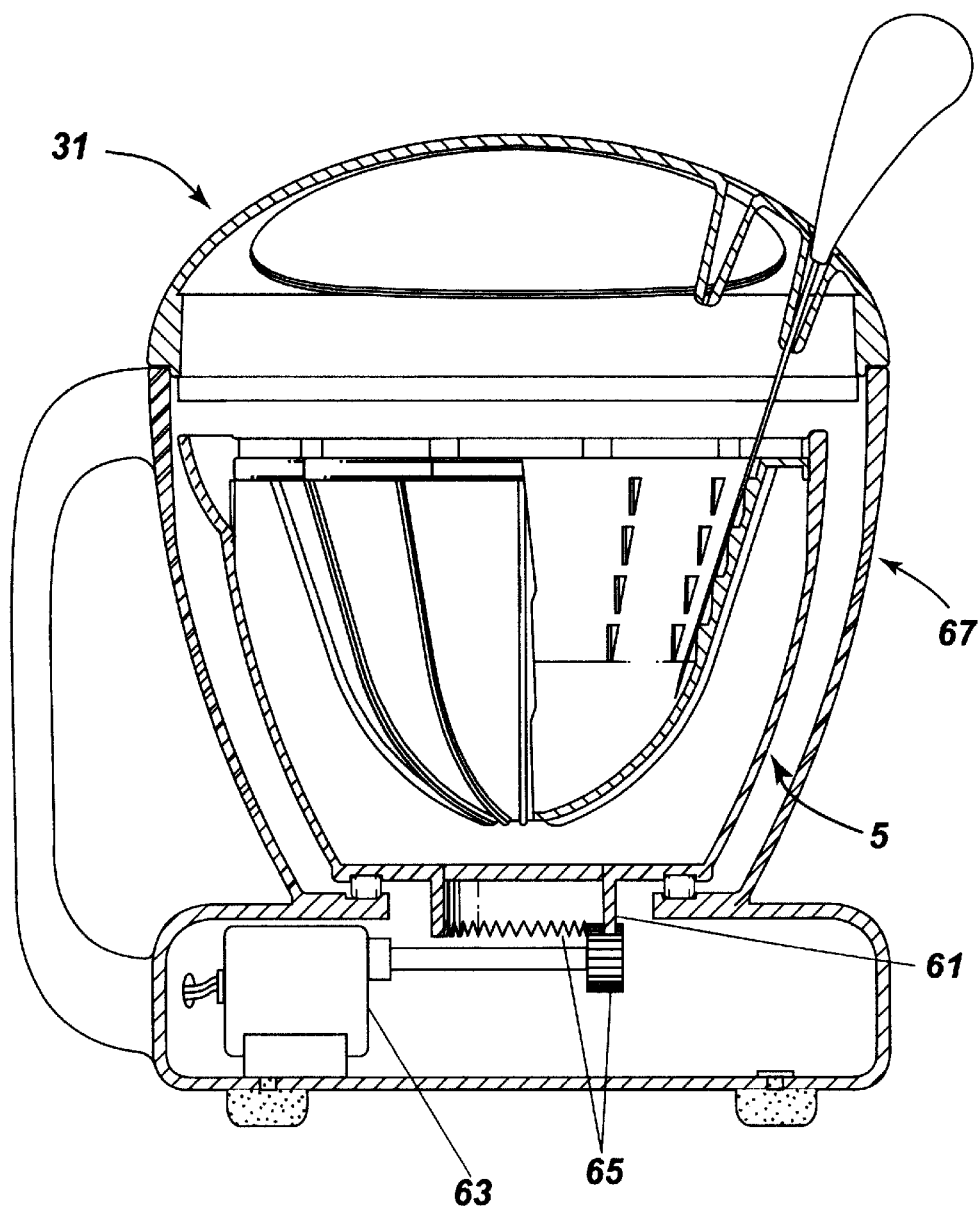
FIG. 10 is a side elevational, cross-section view of a cutting device according to a second preferred embodiment of the invention.

The cutting device 1 disclosed hereinabove is essentially manual. In a second preferred embodiment of the invention, this device could however be electric, as is shown by way of non-restrictive example in FIG. 10.

In this second embodiment, the container 5 is detachably mounted onto a rotating shaft 61 driven by an electric motor 63 via a set of gears 65. The knife-supporting element 31 is mounted on top of a bowl-shaped support 67 in which the container 5 is placed. As may be understood, the container 5 and fruit-receiving cups 17, 17' located therein both rotate relative to the knife-supporting element 31 which is held by the support 67 when this electrically operated device is actuated. This is different from the manual device disclosed hereinabove where the element 31 rotates relative to the cups 17, 17' and container 5. In both cases however, the result is obviously the same. Of course, other configuration could be used for this electric embodiment.

As a matter of fact, numerous modifications could be made to both the preferred embodiments that have just been disclosed without departing from the scope of the present invention. Thus, by way of example, each device could have only one cup or more than two. Its size and more especially the one of its cups could also be adapted to handle much larger fruits such as melons, or other fruits not necessarily of the citrus type, such as kiwis or apples. The shape and visual appearance of the device could also be substantially modified. Moreover, in the case of some fruits like kiwis, use could be made of a thin rod in place of the knife 41 mentioned hereinabove.

I claim:

1. A cutting device for derinding a half-section of a fruit, comprising:

an upwardly opened container having a vertical axis and an annular upper edge concentric with said vertical axis;

an upwardly opened cup for receiving and holding the half-section to be derinded, said cup being coaxially mounted in a removable manner within said container at a short distance from the upper edge thereof, and having a central portion with a bottom;

a knife-supporting element removably mounted in a rotatable manner coaxially on top of the container, said element having an annular bottom edge shaped and sized to fit and be slidable onto the upper edge of the container, said element also having a knife receiving sleeve that extends at a radial distance from said vertical axis and projects downwardly towards the bottom of the central portion of the cup; and a knife having a blade removably insertable into the sleeve after the half-section has been positioned in the cup and the knife-supporting element has been positioned on top of the container, said blade, once inserted, penetrating into the fruit at a short distance from the rind thereof and allowing the half-section of said fruit to be derinded upon rotation of the knife supporting element with respect to the container.

2. The cutting device of claim 1, wherein the cup has an inner surface from which project corrugations shaped and positioned to engage the rind of the citrus fruit to be derinded and to prevent said fruit from being inadvertently rotated together with the blade of the knife.

3. The cutting device of claim 2, wherein the corrugation consists of teeth extending in equally spaced apart radial planes.

4. The cutting device of claim 1, wherein locking means are provided to prevent the cup from being inadvertently rotated together with the blade of the knife once mounted in the container.

5. The cutting device of claim 4, wherein the cup has a peripheral edge of polygonal shape, which acts as said locking means.

6. The cutting device of claim 1, wherein the bottom of the central portion of the cup has an aperture made in it to allow overflowing juice to drip into the container.

7. The cutting device of claim 5, wherein the container is provided with a pouring spout to facilitate recovery of the juice/collected therein.

8. The cutting device of claim 1, wherein the cup is shaped and devised to mountable in upside down position onto the container whenever requested and then used therewith as a citrus juicer.

9. The cutting device of claim 1, wherein the knife-supporting element has a central portion devised and shaped to act as a handle in order to facilitate manual grasping and rotation of said element on top of the container.

10. The cutting device of claim 1, wherein:

said device comprises at least two of said cup, said at least two cups having central portions of different sizes to receive fruits of corresponding different sizes; and said knife-supporting element comprises at least two of said knife receiving sleeves located at different radial distances to allow optimum adjustment of the position of the blade of the knife depending on the size of the central portion of the selected cup.

11. The cuffing device of claim 1, wherein the container has a flat bottom with anti-skidding means externally attached thereto.

12. The cutting device of claim 2, wherein:

locking means are provided to prevent the cup from being inadvertently rotated together with the blade of the knife once mounted in the container;

the bottom of the central portion of the cup has an aperture made in it to allow overflowing juice to drip into the container; and the knife-supporting element has a central portion devised and shaped to act as a handle in order to facilitate manual grasping and rotation of said element on top of the container.

* * * * *